July 21, 1953     E. C. DALE, JR     2,645,774

EYE SHADE

Filed March 26, 1951

INVENTOR.
EDWARD C. DALE JR.
BY

ATTORNEYS.

Patented July 21, 1953

2,645,774

UNITED STATES PATENT OFFICE 2,645,774

EYESHADE

Edward C. Dale, Jr., Christinsted, St. Croix, Virgin Islands

Application March 26, 1951, Serial No. 217,505

5 Claims. (Cl. 2—12)

This invention relates to an improvement in anti-glare eye protectors or eye shades.

It is well known that the human eye suffers various adverse effects from prolonged exposure to extremely bright sunlight or reflected sunlight such as occurs from the surface of water, sand, etc.

The conventional means of protecting the eye from sun glare is to provide a lens or other suitable covering of a tinted or polarized material which will filter out a portion of the light rays and prevent them from reaching the eye. This type of anti-glare protector has numerous obvious disadvantages. For example, there is usually involved the openings between the lens and the face of the wearer, and if closure members are provided, they obstruct the vision of the wearer. Furthermore, the tinted lens provides a distortion of the natural color and will effect the visual clarity or perception of, particularly, distant objects.

Various types of lensless eye shields or shades have been suggested heretofore, but these shades all involve various disadvantages, including inadequate protection of the eye, restriction or confinement of the range of vision to a limited degree on horizontal plane because of the side member or blinders which are usually involved in such shades.

It is an object of the present invention to provide an eye shade which will cut down the amount of light reaching the eye of the wearer and will effectively shield the eyes of the wearer from the direct rays of sunlight and from rays of sunlight which are reflected upwardly or downwardly from relatively nearby objects or from the earth, water, or low lying relatively nearby clouds in the sky.

It is a further object of this invention to provide the wearer with an eye shade which will not restrict the wearer's spread of horizontal vision, i. e., will permit unobstructed vision when the wearer turns his eyes from one side to the other.

It is a further object of this invention to provide an eye shade which simultaneously will permit unrestricted vision of distant object or objects viewed by the wearer generally horizontally from the wearer's eye, will permit the wearer to look directly downwardly at the ground adjacent to the wearer's feet with a minimum of obstruction to vision, and will provide an appreciable filtering on light reaching the wearer's eyes from the ground at an intermediate distance from the wearer's position to previously mentioned horizontal objects.

These and other objects of the invention will become apparent when read in conjunction with the accompanying drawing, in which.

Figure 1:
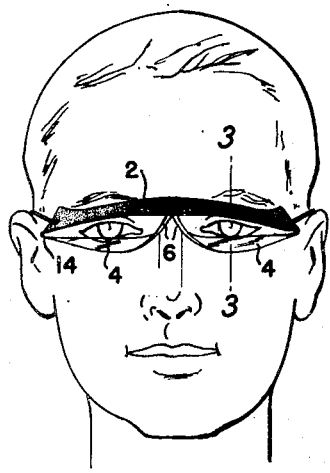
Figure 1 is a showing of the eye shade as it is worn.

The shade comprises an upper shade 2 which is adapted to fit across the wearer's face and engage the head immediately below the eyebrows of the wearer. This portion of the eye shade may be opaque, translucent or of smoked, tinted or polarized material suitable to effectively shield the eyes and is preferably of dull non-reflectant finish on its underside 3.

The lower shade comprises the portions 4 which are preferably adapted to engage the wearer's face below the eyes and are of reducing width as they extend inwardly toward the nose. The lower shades at their inner portions terminate adjacent to the nose in the narrow strips 6 which are turned upwardly and are preferably, but not necessarily, attached to the upper shade as shown at 8. The width of each of the strips 6 is such that the cross vision of the wearer is not obstructed in either direction by the strips 6 before it is obstructed by the wearer's nose. The inner portions of the upper and lower shades, which are adapted to engage the face, may be enlarged or formed with the beads 10 and 12, respectively, to provide more comfortable engagement with the wearer's face.

The upper and lower shades are connected at the outer or sideward extremes of the shade, the connection being of curved form. The radius of curvature of the side connection at the forward portion of the shade, as shown at 14, is relatively smaller than the radius of curvature at the inner or rearward connection between the upper and lower shades, as shown at 16. The larger radius of curvature of the inner portion of the connection between the upper and lower shades provides for continuous engagement of the shade with the face of the wearer in the regions of the head surrounding the outer side of the eyes. The smaller radius of curvature of the outer portion of connection between the upper and lower shades provides for proper shielding of the eyes as will be hereinafter described.

The shade may be attached to the wearer's head by means of conventionally formed ear engaging members 18 which may be hingedly connected to the eye shade by means of screws or other suitable mounting pins 20. Alternately, there may be provided a suitable head band or strap to mount the shade to the head of the wearer.

The upper shade may be made of metal, synthetic plastic or other suitable material. The lower shade is transparent and, if the shade is made of metal, the transparent material may be mounted in the cut-away portion of the metal shade as indicated at 22. If the shade is of plastic material, the lower shades may be made of a transparent plastic which is joined to the upper shade which may be made of opaque plastic or, alternately, the entire shade may be made of a single piece of transparent plastic with the upper shade coated with a suitable opaque, translucent transparent coating to prevent or limit the transmission of light therethrough.

The transparent lower shades are provided to permit the wearer to look downwardly and to see, for example, objects in the path of his walking with relatively unobstructed vision. The transparent lower shade is preferably tinted to provide filtering of the light rays reaching the eyes from objects ahead of the wearer but below the normal horizontal line of vision which is unobstructed by the shade.

Figure 3:
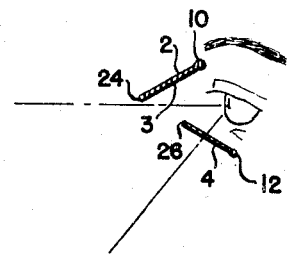
Figure 3 is a diagrammatic showing of a section of the shade taken on the trace 3—3 of Figure 1 showing the physical and angular relations between portions of the shade, and those portions of the shade and eye of the wearer.
Figure 2:
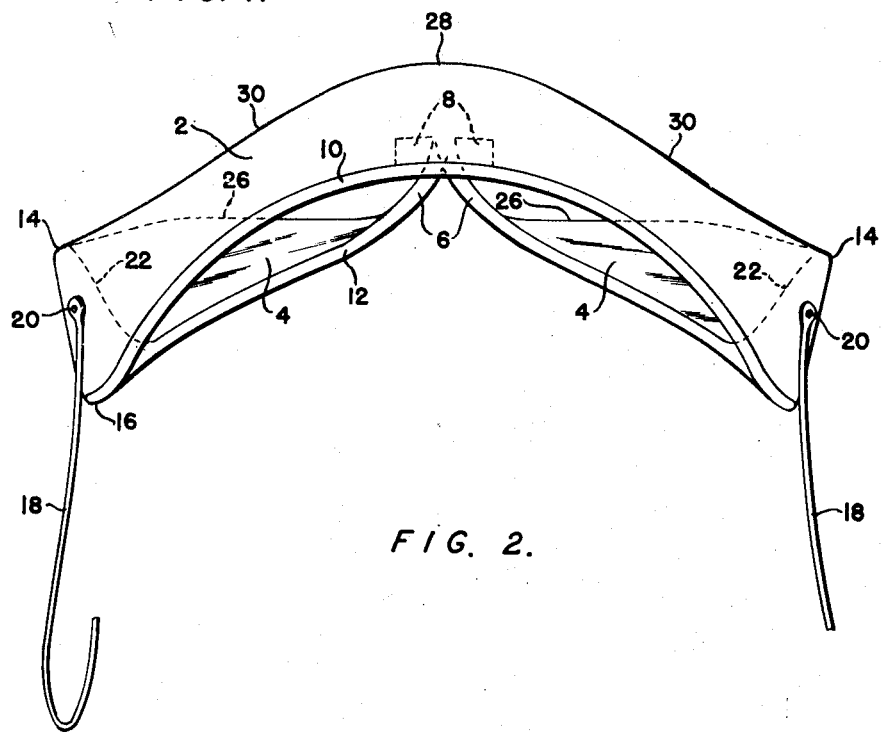
Figure 2 is a plan view of the eye shade.

The relative positions of the outer edges of the upper and lower shades, as indicated at 24 and 26 in Figure 3, is of particular importance. The upper shade is directed outwardly and downwardly from the wearer's face as previously described. The center portion 28 of the upper shade 2 is somewhat more extended and downwardly directed than are the portions 30 of the upper shade. This provides, as shown in Figure 1, for a generally horizontal shielding line being provided by the upper shade in the shade region between the eye centers and thus establishing a horizontal shade in that region. The lower shades 4, which are of reducing width as they extend centrally toward the portions 6 as shown in Figure 2, are directed upwardly from their line of contact with the wearer's face and terminate in edges 26 which are formed to provide a substantially horizontal shading below the eye as shown in Figure 1.

There is thus provided between the upper and lower shades a slit-like opening having for the center portion of its length what appears to the wearer to be parallel edges, and having its end portions merged together and joining in a curved portion as previously described. The outer curved upper and lower shield joining portions 14 are spread outwardly or sidewardly sufficiently to permit unobstructed side vision to the degree normally employed and, as previously described, the portions 6 are of such width as not to obstruct the normal cross vision across the nose.

As shown in Figure 3, the outer edge 26 of the lower shade terminates sufficiently to the rear or inwardly of the outer edge 24 of the upper shade to prevent the bright rays of light passing generally downwardly toward the viewer from passing under the upper shade and reflecting upon the upper surface of the lower shade into the eye of the viewer.

The shade may be made of various materials and may be variously attached to the head of the wearer. The upper shade may be provided with a hinged central portion or may be made of flexible material or may be otherwise provided with suitable means to permit folding of the shade to provide for convenient packing or carrying of the shade by the user when the shade is not being worn. It will be apparent that these and other modifications may be made in the embodiment of the invention disclosed herein without departing from the scope of the invention as set forth in the following claims.

What is claimed is:

1. An eye shade comprising an upper shade adapted to fit against the face of the wearer, the shade being formed to extend forwardly and downwardly from the face above the eyes and terminating slightly above the normal horizontal line of vision, lower shades one under each eye adapted to fit against the face and formed to extend forwardly and upwardly therefrom and terminating slightly below the normal horizontal line of vision, the lower shades each being of reducing width as they extend toward the wearer's nose and terminating adjacent to the nose, the forward edges of the lower shades terminating back of and below the forward edge of the upper shade to be shaded thereby, the forwardmost edges of the upper and lower shades coming together at their extreme sideward portions, and means for supporting the shade in position against the face of the wearer.

2. An eye shade comprising an upper shade adapted to fit against the face of the wearer, the shade being formed to extend forwardly and downwardly from the face above the eyes forming an acute angle to the normal horizontal line of vision and terminating slightly above the normal horizontal line of vision, lower shades one under each eye adapted to fit against the face and formed to extend forwardly and upwardly therefrom forming an acute angle to the normal horizontal line of vision and terminating slightly below the normal horizontal line of vision, the lower shades each being of reducing width as they extend toward the wearer's nose and terminating adjacent to the nose, the forward edges of the lower shades terminating back of and below the forward edge of the upper shade to be shaded thereby, the forwardmost edges of the upper and lower shades coming together at their extreme sideward portions, and means for supporting the shade in position against the face of the wearer.

3. An eye shade comprising an upper shade adapted to fit against the face of the wearer immediately below the eyebrows, the shade being formed to extend forwardly and downwardly from the face above the eyes forming an acute angle to the normal horizontal line of vision and terminating slightly above the normal horizontal line of vision, transparent lower shades one under each eye adapted to fit against the face immediately below the eyes and formed to extend forwardly and upwardly therefrom forming an acute angle to the normal horizontal line of vision and terminating slightly below the normal horizontal line of vision, the lower shades each being of reducing width as they extend toward the wearer's nose and terminating adjacent to the nose, the forward edges of the lower shades terminating back of and below the forward edge of the upper shade to be shaded thereby, the upper and lower shades coming together in fixed relation with the forwardmost edges of the upper and lower shades coming together at their extreme sideward portions, and means for supporting the shade in position against the face of the wearer.

4. An eye shade comprising an upper shade adapted to fit against the face of the wearer immediately below the eyebrows, the shade being formed to extend forwardly and downwardly from the face above the eyes forming an acute angle to the normal horizontal line of vision, terminating slightly above the normal horizontal line of vision and providing a generally horizontal upper shade line along its forward central portion, transparent lower shades one under each eye adapted to fit against the face immediately below the eyes and formed to extend forwardly and upwardly therefrom forming an acute angle to the normal horizontal line of vision and terminating slightly below the normal horizontal line of vision, the lower shades each being of reducing width as they extend toward the wearer's nose and terminating adjacent to the nose, the reducing width and the upward tilt of the lower shades providing forward edges of the lower shades disposed to provide substantially horizontal lower shade lines, the forward edges of the lower shades terminating back of and below the forward edge of the upper shade to be shaded thereby, the upper and lower shades coming together in fixed relation with the forwardmost edges of the upper and lower shades coming together at their extreme sideward portions, the vertical space between the upper and lower shades at the forward region of their junction being relatively small with respect to the vertical space between the upper and lower shades in the rearward region of their junction, the rearward portion of each junction engaging a side of the face adjacent to the eye and the forward region of each junction being spread sidewardly with respect to the rearward portion of the junction to provide substantially no obstruction to the normal side vision of the wearer, and means for supporting the shade in position against the face of the wearer.

5. An eye shade comprising an upper shade adapted to fit against the face of the wearer, the shade being formed to extend forwardly and downwardly from the face above the eyes forming an acute angle to the normal horizontal line of vision and terminating slightly above the normal horizontal line of vision, lower shades one under each eye adapted to fit against the face and formed to extend forwardly and upwardly therefrom forming an acute angle to the normal horizontal line of vision and terminating slightly below the normal horizontal line of vision, the lower shades each being of reducing width as they extend toward the wearer's nose and terminating adjacent to the nose, the forward edges of the lower shades terminating back of and below the forward edge of the upper shade to be shaded thereby, the forwardmost edges of the upper and lower shades coming together at their extreme sideward portions, the vertical space between the upper and lower shades at the forward region of their junction being relatively small with respect to the vertical space between the upper and lower shades in the rearward region of their junction, the rearward portion of each junction engaging a side of the face adjacent to the eye and the forward region of each junction being spread sidewardly with respect to the rearward portion of the junction to provide substantially no obstruction to the normal side vision of the wearer, and means for supporting the shade in position against the face of the wearer.

EDWARD C. DALE, Jr.

References Cited in the file of this patent

UNITED STATES PATENTS

| Number | Name | Date |
| --- | --- | --- |
| 1,190,567 | Malcom | July 11, 1916 |
| 2,139,275 | Lee | Dec. 6, 1938 |
| 2,385,405 | Crowther | Sept. 25, 1945 |
| 2,441,659 | Chalmers | May 18, 1948 |
| 2,556,433 | Mitchell | June 12, 1951 |